(No Model.)

H. M. LOVEJOY.
APPARATUS FOR THE MANUFACTURE OF HYDROGEN GAS.

No. 526,243. Patented Sept. 18, 1894.

Witnesses.
A. C. Harmon
Fred S. Greenleaf

Inventor:
Herbert M. Lovejoy.
by Crosby & Gregory
attys.

THE NORRIS PETERS CO., PHOTO-LITHO., WASHINGTON, D. C.

UNITED STATES PATENT OFFICE.

HERBERT M. LOVEJOY, OF BOSTON, MASSACHUSETTS.

APPARATUS FOR THE MANUFACTURE OF HYDROGEN GAS.

SPECIFICATION forming part of Letters Patent No. 526,243, dated September 18, 1894.

Application filed April 7, 1894. Serial No. 506,699. (No model.)

*To all whom it may concern:*

Be it known that I, HERBERT M. LOVEJOY, of Boston, county of Suffolk, State of Massachusetts, have invented an Improvement in Apparatus for the Manufacture of Hydrogen Gas, of which the following description, in connection with the accompanying drawings, is a specification, like letters and figures on the drawings representing like parts.

In the application of portable apparatus to railway cars for manufacturing illuminating gas therefor, it is necessary to provide means for overcoming the effect of sudden jars and shocks caused by stopping and starting. Such jarring causes the pressure of the gas to vary, at times decreasing it so much that the lights will be extinguished, or will burn very dimly.

This invention has for its object the production of portable apparatus for manufacturing illuminating gas, wherein jarring of the apparatus will be so counteracted by means to be described that the light will burn clearly and steadily, the apparatus being simple and cheap.

In accordance therewith my invention consists in various details of construction to be hereinafter fully described and particularly pointed out in the claims at the end of this specification.

Figure 1:
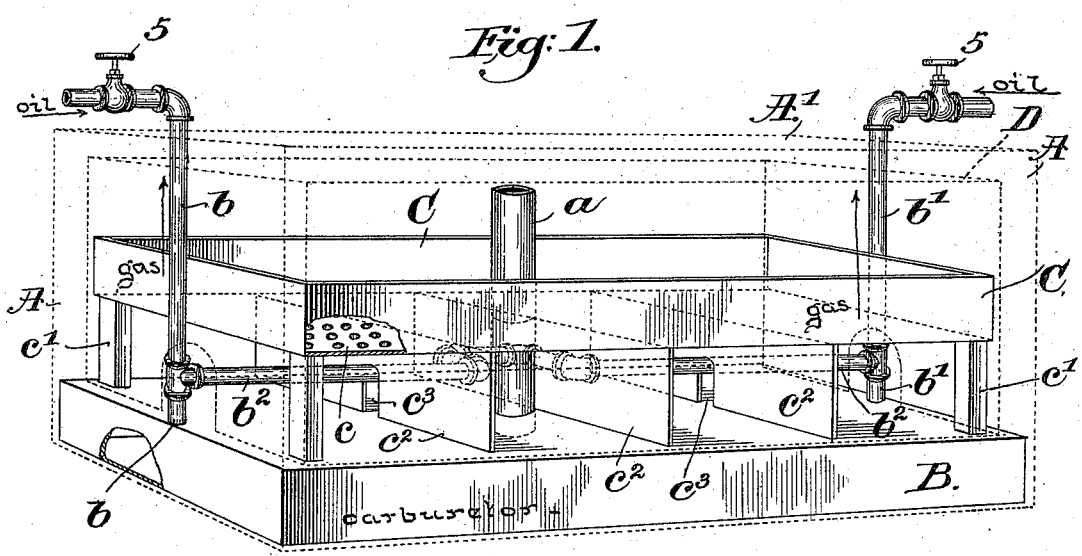
Figure 2:
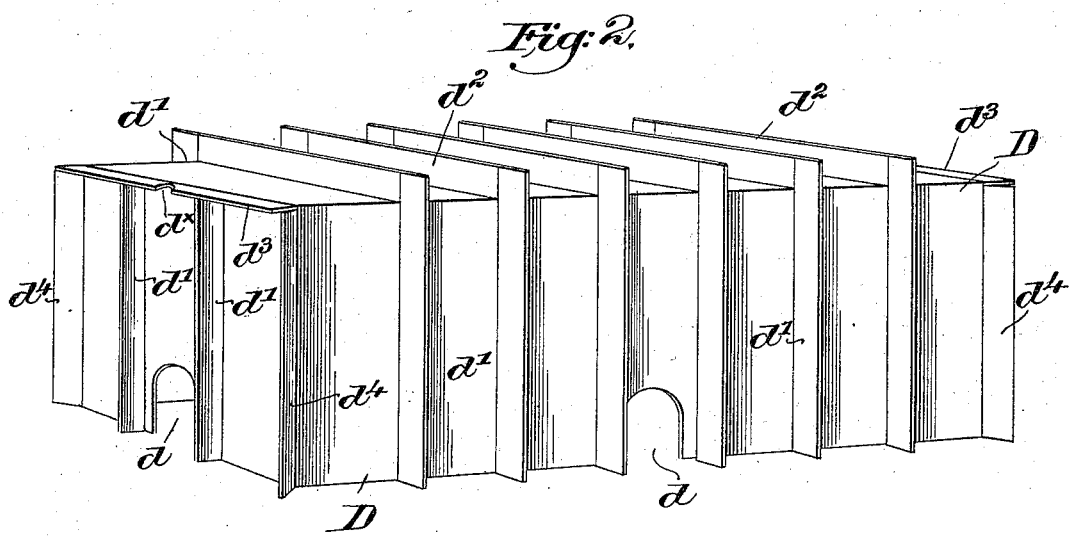

Figure 1 is a perspective view of the gas reservoir, and the pan for the gas-generating material resting thereon, the gasometer being omitted, and Fig. 2, is a similar view of the gasometer.

I have shown in Fig. 1 by dotted lines the external body or casing A of the generator, represented as rectangular in shape, made water tight and provided with a removable cover $A'$, secured thereto by any suitable means. A strong metallic gas reservoir B enters and is adapted to rest upon the bottom of the casing A, as shown in full lines Fig. 1, and partly broken out at one end. Projecting upwardly from about the center of the top of the reservoir is a pipe or tube $a$, open at its upper end, and opening at its lower end into the reservoir, to conduct the gas thereto as it is generated, as is to be described. A pan C having imperforate sides and a perforated bottom $c$, is supported some distance above the gas reservoir by legs $c'$, which rest on the latter, the pan having an opening in its bottom through which the pipe $a$ easily passes. A series of transverse guards or baffle plates $c^2$ are rigidly secured to the bottom of the pan, and of sufficient depth to rest upon the top of the reservoir B when the pan is in place thereon, as shown in Fig. 1. The guards are vertically slotted or cut away, as at $c^3$, to embrace the gas delivery conduits, to be described. A rectangular dome or gasometer D is shown in full lines in Fig. 2, and by dotted lines, Fig. 1, adapted to fit snugly over the pan C and rest upon the reservoir B, and thereby keeping the pan in its proper place. Openings $d$ are made in the sides and ends of the dome to permit free circulation of the exciting fluid within and around it, and a series of vertical guards or baffle plates $d'$ are secured to the exterior of the dome, upon its sides and ends, extending from top to bottom thereof, and wide enough to touch the interior of the casing A, to steady and hold the dome in place. Similar plates $d^2$ are secured to the top of the gasometer, extending between it and the cover $A'$, while horizontal guards $d^3$ are secured to the upper edges of the ends, as clearly shown in Fig. 2.

Vertical guards $d^4$ are secured to the corners of the dome and extend diagonally therefrom into the corners of the casing A, so that when the cover $A'$ is in place the dome D is held securely from movement, it in turn holding the pan C in place.

Tubes or conduits $b$ and $b'$ enter the top of the gas reservoir B at or near opposite ends, provided with suitable stop cocks 5, a pipe $b^2$ connecting said pipes and passing through the cut away portions $c^3$ of the guards $c^2$, see Fig. 1, the pipe $b^2$ having a bend therein to carry it around the gas inlet $a$ of the reservoir. Either of the conduits $b$ or $b'$ may be used as a filling tube, to supply the reservoir B with naphtha, gasoline, or any similar carbonaceous material, the other conduit forming the gas outlet, from which the gas may be conducted to suitable burners. It will be noticed that the gas outlet is in continuous communication, by means of the connecting pipe $b^2$ with different parts of the reservoir, and if, as is often the case when the apparatus is in use on railway cars, the liquid in the reservoir should flow to one end and cover the open end of the outlet pipe, the flow of gas will not be interrupted, for the pipe at the other end will be uncovered and the gas flows by the pipe $b^2$ to the gas outlet pipe, thus forming a species of by-pass. The openings $d$ in the ends of the dome receive the pipe $b^2$, and notches $d^\times$, see Fig. 2, are made in the guards $d^3$ for the upright pipes $b$ and $b'$. In operation, the reservoir B having been filled with carbonaceous material, iron scraps and marble-dust or other gas generating substance are placed in the pan C, after which the dome D is put in position and the casing A supplied with a weak solution of sulphuric acid and water, to a suitable height, and the cover is secured in place. The acid solution passes into the pan C through its perforated bottom and acts upon the iron and marble-dust therein, generating hydrogen and carbonic-acid gas in well known manner, which passes through the inlet pipe $a$ into the reservoir B, coming into contact therein with the carbureting substance and receiving its illuminating properties. The reservoir B thus becomes a carburetor, and the gas is drawn therefrom for use by whichever of the tubes $b$ or $b'$ is arranged therefor.

The guards or baffle plates upon the exterior of the dome and on the under side of the pan C divide the acid solution into comparatively small portions, so that sudden or prolonged jarring cannot impart to the whole solution a swashing motion or agitation, the guards so breaking up the motion imparted to the liquid that it has practically no effect thereupon, and in consequence the formation of the gas and the pressure in the gasometer are uniform.

The carbonaceous material in the carburetor is usually highly inflammable, but in the construction herein shown the carburetor is more or less surrounded by a non-inflammable and fire extinguishing liquid, so that the apparatus is particularly adapted for use in cars or other conveyances.

It will be evident from the foregoing description that changes may be made in the details of construction without departing from the spirit of my invention, which is not limited to the exact construction and arrangement shown.

I claim—

1. In a gas generator, a casing, a carburetor therein, a perforated support for a portion of the generating material, located above the carburetor, and guards depending from the bottom of said support to the carburetor, combined with a dome adapted to inclose the support, vertical guards on its exterior, a gas inlet for the carburetor opening into the dome, and a plurality of outlets for the gas leading from the carburetor, substantially as described.

2. In a gas generator, a casing, a dome therein having vertical guards secured to its exterior and extending to the inner surface of the casing, to maintain the dome in place, a carburetor in the bottom of the casing, and a gas inlet therefor opening into the dome, combined with a support for the gas generating material within the dome, and a plurality of gas outlets connected to the carburetor, substantially as described.

3. In a gas generator, a casing, a carburetor therein, a gas inlet therefor opening into the dome, a supply tube for the carburetor, and a gas delivery tube leading from the carburetor out of the casing, combined with a dome, a support therein for the gas generating material, depending guards upon the under side of said support, and vertical guards upon the exterior of the dome, substantially as described.

4. A dome for portable gas generators, provided with a series of vertical guards or baffle plates upon its exterior, a horizontal guard plate, and upright guards on its top, substantially as described.

In testimony whereof I have signed my name to this specification in the presence of two subscribing witnesses.

HERBERT M. LOVEJOY.

Witnesses:
JOHN C. EDWARDS,
FREDERICK L. EMERY.